(12) United States Patent
Korger

(10) Patent No.: US 8,934,341 B2
(45) Date of Patent: *Jan. 13, 2015

(54) APPARATUS AND A METHOD OF RECEIVING AND STORING DATA PACKETS CONTROLLED BY A CENTRAL CONTROLLER

(75) Inventor: Peter Korger, Lynge (DK)

(73) Assignee: Napatech A/S, Soborg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/513,522

(22) PCT Filed: Dec. 6, 2010

(86) PCT No.: PCT/EP2010/068964
§ 371 (c)(1),
(2), (4) Date: Aug. 10, 2012

(87) PCT Pub. No.: WO2011/067408
PCT Pub. Date: Jun. 9, 2011

(65) Prior Publication Data
US 2012/0300787 A1    Nov. 29, 2012

Related U.S. Application Data

(60) Provisional application No. 61/266,788, filed on Dec. 4, 2009.

(51) Int. Cl.
*H04L 1/00*       (2006.01)
*H04L 12/863*   (2013.01)
*H04L 12/803*   (2013.01)
(Continued)

(52) U.S. Cl.
CPC .......... *H04L 47/6255* (2013.01); *H04L 47/125*

(2013.01); *H04L 49/90* (2013.01); *H04L 49/9047* (2013.01); *H04L 47/568* (2013.01)
USPC ......................... 370/230.1; 370/230; 370/412

(58) Field of Classification Search
None
See application file for complete search history.

(56) References Cited

U.S. PATENT DOCUMENTS 4,025,903 A    5/1977   Kaufman et al.
4,330,825 A    5/1982   Girard et al.
(Continued)

FOREIGN PATENT DOCUMENTS

| WO | 03/071740      | 8/2003 |
|----|----------------|--------|
| WO | 2009093299 A1  | 7/2009 |
| WO | 2010/076649    | 7/2010 |

OTHER PUBLICATIONS

Patent Cooperation Treaty, "International Search Report and Written Opinion" by Autorized Officer P. Jimenez Hermandez, from the European Patent Office; mailed Mar. 22, 2011 in PCT/EP2010/068964; pp. 1-10.

(Continued)

*Primary Examiner* — Hassan Phillips
*Assistant Examiner* — Mark A Mais
(74) *Attorney, Agent, or Firm* — McHale & Slavin, P.A.

(57) ABSTRACT

An assembly and a method where a number of receiving units receive and store data in a number of queues de-queued by a plurality of processors/processes. If a selected queue for one processor has a fill level exceeding a limit, the packet is forwarded to a queue of another processor which is instructed to not de-queue that queue until the queue with the exceeded fill level has been emptied. Thus, load balancing between processes/processors may be obtained while maintaining an ordering between packets.

12 Claims, 4 Drawing Sheets

(51) Int. Cl.
*H04L 12/861* (2013.01)
*H04L 12/875* (2013.01)

(56) References Cited

U.S. PATENT DOCUMENTS

| | | | |
|---|---|---|---|
| 6,141,323 | A | 10/2000 | Rusu et al. |
| 6,345,350 | B2 | 2/2002 | Maruyama et al. |
| 6,430,191 | B1 | 8/2002 | Klausmeier |
| 6,594,234 | B1 | 7/2003 | Chard et al. |
| 6,671,747 | B1 | 12/2003 | Benkual et al. |
| 7,289,442 | B1 | 10/2007 | Srinivasan |
| 7,680,139 | B1 | 3/2010 | Jones |
| 7,787,370 | B1 | 8/2010 | Aweya |
| 8,356,125 | B1 * | 1/2013 | Secatch ............ 710/52 |
| 2002/0169990 | A1 * | 11/2002 | Sherburne, Jr. ......... 713/300 |
| 2003/0056073 | A1 | 3/2003 | Zeiger |
| 2004/0008705 | A1 | 1/2004 | Lindsay |
| 2005/0207423 | A1 | 9/2005 | Herbst |
| 2005/0213582 | A1 | 9/2005 | Wakumoto |
| 2006/0072578 | A1 | 4/2006 | Alfano |
| 2006/0153078 | A1 | 7/2006 | Yasui |
| 2006/0221974 | A1 | 10/2006 | Hilla et al. |
| 2006/0268939 | A1 | 11/2006 | Dries et al. |
| 2007/0156975 | A1 | 7/2007 | Himpe |
| 2007/0220193 | A1 | 9/2007 | Ikeda et al. |
| 2008/0120480 | A1 | 5/2008 | Dryfoos |
| 2008/0256305 | A1 | 10/2008 | Kwon et al. |
| 2008/0288675 | A1 | 11/2008 | Kubota |
| 2008/0301398 | A1 | 12/2008 | Falik et al. |
| 2009/0100296 | A1 | 4/2009 | Srinivasan et al. |
| 2010/0281190 | A1 | 11/2010 | Namihira |

OTHER PUBLICATIONS

Pustisek, M., et al., "Architecture-Dependent Packet Switch Performance Under Imbalanced Traffic," Electrotechnical Review, Ljubljana, Slovenija, 72(1); 36-44, 2005.

* cited by examiner

APPARATUS AND A METHOD OF RECEIVING AND STORING DATA PACKETS CONTROLLED BY A CENTRAL CONTROLLER

CROSS-REFERENCE TO RELATED APPLICATIONS

This application is a §371 national stage entry of international Application No. PCT/EP2010/068964, filed Dec. 6, 2010, which claims priority to U.S. Provisional Patent Application No. 61/266,788 filed Dec. 4, 2009, the entire contents of which are incorporated herein by reference.

The present invention relates to a manner of receiving data packets using a parallel receiving technology and providing a central determination of storing addresses and a central storing thereof.

In a first aspect, the invention relates to an assembly comprising an apparatus for receiving and storing data packets and a plurality of de-queuing processors or processes, the apparatus comprising a storing unit, a controlling unit and a plurality of data receiving and storing elements, wherein:
  the storing unit is adapted to hold at least part of a plurality of data packets in a plurality of queues thereof, each queue comprising a number of storing elements each being defined by an address,
  each processor or process is adapted to de-queue data from a first group of the queues, the queues of the individual first groups being non-overlapping, the processors/processes being adapted to forward information to the controlling unit in relation to a de-queuing of data from a queue,
  each data receiving and storing unit comprises:
    means for accessing or receiving a data packet,
    means for receiving from the controlling unit an address for storing at least part of the data packet, and
    means for facilitating storing of the at least part of the data packet in the storing unit at the received address,
  the controlling unit comprises:
    means for determining information relating to a fill level of the queues,
    means for selecting an address by:
      for a received/accessed data packet, determining a second group of queues, each second group of queues comprising a queue from each first group of queues, the queues of the second groups of queues being non-overlapping,
      if the fill level of a presently selected first queue of the determined second group exceeds a predetermined level, selecting a second queue of the determined second group,
      selecting the address as an address of the selected queue of the second group,
    means for forwarding the selected address to the receiving and storing element having received/accessed the data packet,
the process/processor relating to the selected second queue being adapted to not process this queue, until the selected first queue with the exceeded predetermined level is empty.

In the present context, the apparatus may be a single piece of hardware within a single housing or may be formed by a number of separate elements, such as the storing unit and/or the controlling unit separate from the receiving/storing units, which may be separate elements detachably interconnectable to the other elements, but interconnected so as to exchange data. The advantage of this is that the number of receiving/storing elements may be varied or replaced to suit differing needs or requirements. This exchange may be under any data transfer protocol, such as TCP, Ethernet, Bluetooth or the like, and using any type of data transfer, wired or wireless.

Thus, the receiving/storing units may be provided as separated pieces of hardware, such as each being embodied by a separate PCB, processor, FPGA or the like. Alternatively, the same PCB/processor/FPGA may form a multiple of the receiving/storing units. The controlling unit may be separate from the receiving/storing units or may form part of one or more thereof.

Naturally, the individual means of the receiving/storing units may be obtained or shaped as individual elements, such as processors, software controlled or hardwired, FPGAs, special purpose circuits, ASICS or the like. Alternatively, multiple such means may be combined into a single such processor or the like.

A data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets.

A data packet usually has a number of different information items or types, such as address data, payload or the like, which are each positioned at well defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in the analysis. The type or standard may be derived directly from the data packet, such as when a particular data item of the packet identifies the type/standard, or may be derived from data derived from the data packet, such as on the basis of recognition of types and positions of data items of the data packet and subsequently determination of type(s) or standard(s) of data packet in which such data may be found at such position(s).

Any part of a data packet may be stored. If the data packet is not desired output again, addressing information therein, e.g., may be deleted in order to not take up space.

Data packets may be ordered and, if so, in a multiple of manners and for a number of reasons. Usually, data exchange between computers is a file transfer, TCP transfer, VoIP or the like, where the order of the individual packets is important. Usually, such transfers are called streams.

A stream of data packets normally is a sequence of data packets transmitted from a single transmitter to one or more receivers. These data packets relate to e.g. a single file or the like transmitted in smaller portions, being the payload of the packets. The transmitter and receiver, or any intermediate network elements, will usually then have addresses also represented in the packet. In addition, other stream identifying information may be present in the data packet, depending on the individual data packet standard.

Thus, a stream may be identified on the basis of e.g. the addresses and/or the stream identifying information, whereby, if used consistently, the same information may be derived, and any subsequent process may identify the stream merely from the information.

In another situation, data packets may be provided with information therein determining the order thereof, such as a sequence number or a time stamp. Thus, this information may be used for ordering the packets.

The storing unit comprises a number of queues each comprising a number of storing elements each defined by an address. Usually, a storing unit has separately addressable elements, and a number of such elements may form a queue. Preferably, a queue comprises a plurality of sequential addresses, but this is not a requirement.

Data packets may have different sizes and may then take up a varying number of addresses.

Naturally, the storing unit may be any form of storing unit, such as a monolithic storing unit or one composed by a number of storing elements separated in space. Usual storing technologies are based on hard drives, floppy discs, RAM, ROM, PROM, EPROM, EEPROM, Flash, memory cards, CD-ROM, DVD, memory cards, or the like.

If separate storing units are provided, the address will describe both the identity of the actual storing unit and the "local address" therein.

The controlling unit may be formed by any type of processor, hardwired or software controlled, or may be a special purpose circuit. The operation of the controlling unit is to determine the address for the individual data packets. In this manner, an ordering of the data packets may be obtained if desired.

The controlling unit is able to determine a fill level of the queues. In the present context, the fill level may relate to a number of data packets present in a queue or a number of addressable elements taken up by the queue. This fill level may be represented as an amount/number of data/packets/addresses or as a percentage, when this number/amount is compared to a maximum number/amount.

Naturally, any number of receiving/storing units may be used. When a plurality of receiving/storing units are used, parallel receipt and storing may be performed. Any number of receiving/storing units may be used, such as 2, 3, 4, 5, 6, 7, 8, 10, 15, 20 or more. All these receiving/storing units may, as is described further below, be identical or nearly identical, or they may be instantiated or created as different circuits with different operations. Each receiving/storing unit may have a controlling unit, but only one is required. In another situation, only one receiving/storing unit comprises the controlling unit but is otherwise identical to the remaining receiving/storing units.

The accessing/receiving means may actually receive and/or store the data or data packet. Alternatively, the data packet may be received or stored at another position or in an apparatus with which the receiving/storing unit communicates, whereby the data of the data packet is accessed remotely by reading the data while being stored in the other apparatus. The latter will usually provide a slower processing, as the data packet is accessed remotely.

Even though it is less preferred, the address received may not be the actual address in the storing unit at which the data packet is to be stored. Alternatively, information may be received from which this address may be derived.

Preferably, the storing of data packets in the storing unit is performed by DMA, which is the fastest manner of storing data in a storing unit.

The facilitating means may store the at least part of the data packet directly in the storing unit, such as over a data connection or it may facilitate storing of the data packet if stored at another location. Then, the address may be transferred to this other location, which then handles the storing of the data packet.

Naturally, the receiving means, the forwarding means and the facilitating means may comprise drivers, connectors etc. required to handle this operation and communicate the data as required.

In this context, a processor or process may be any type of circuit or program facilitating de-queuing of data and potentially a processing thereof. This processing may be any type of processing, such as surveillance of data traffic, dividing the data packets to different recipients or the like. Also, the processing may be an outputting of the data packets from the assembly and forwarding to subsequent networking elements, such as servers or the like.

The queue(s) of the individual first and second groups are non-overlapping, whereby any queue only belongs to one first group and/or one second group and is de-queued by one process/processor. Thus, from the fill level of all queues de-queued by a process/processor, an indication may be derived of how busy that process/processor is. Then, if a process/processor is too busy, a data packet/stream/type may be forwarded to a queue of another process/processor.

Also, the queues of a first group may be used for quality of service operation, so that each queue e.g. handles only a single priority, and different queues handle different priorities. The priority may be determined from the data packet or the time stamp.

When a process/processor de-queues a data packet, or a part thereof, stored in the storing unit, the controlling unit is informed accordingly, so that the controlling unit is able to determine the correct fill level of this queue, which has now been reduced.

The process/processor relating to the selected second queue being adapted to not process this queue, until the selected first queue with the exceeded predetermined level is empty. This may be a programmed feature thereof or may be controlled by a storage or instruction which the process/processor may be fed or may read which determines whether the process/processor may de-queue from a given queue.

In a preferred embodiment, each data receiving and storing element further comprises means for generating information relating to the received/accessed data packet and forwarding the generated information to the controlling unit, the controlling unit further comprising means for receiving generated information, and the selecting means then being adapted to select the address also on the basis of the received, generated information.

Thus, the address and, if desired, the queue, may be determined from the generated information. As described above, data packets may be divided into streams, types, etc. and it may be desired to provide data packets of the same type/stream or the like into the same queue(s).

In general, the generating means may be adapted to generate, as at least part of the generated information, information relating to a point in time (time stamp) of receipt of the data packet. In this embodiment, it is preferred that the receiving/storing units have synchronized timing units, so that the time stamp of data packets from different receiving/storing units is comparable.

An advantage of this embodiment is that if data packets of e.g. a stream are received at different receiving/storing units, the identity of the stream may be determined from the packet and from the generated information forwarded to the controlling unit, and the order of receipt may be determined from the time stamp, so that the data packets may be stored in a desired queue and in e.g. a desired order.

In a preferred embodiment, each of the queues is implemented as a number of consecutive addresses and the controlling means:
  is adapted to hold, for each queue, a write pointer identifying a next address in which to add data, or a last address to which data was added, and a read pointer identifying a next address to be read/de-queued from the queue, or a last address read/de-queued, and comprises means for:
updating the write pointer of the queue to which the selected address relates, when an address is selected and
updating, on the basis of information forwarded from the processors/processes, the read pointer of the queue from which data has been de-queued.

The use of the read/write pointers as end point pointers makes handling of the queues very simple. This is in particular simple when the addresses are consecutive. The number of addresses taken up, e.g. an indication of the fill level, may simply be derived by subtracting one pointer from the other.

The updating of the write pointer may require knowledge of a size of the data packet or the part thereof to be stored, as different size data may take up different amounts of space and thus a different number of the addresses.

The updating of the read pointers may be based on a list of all addresses from which data has been de-queued or simply the last still-data-containing address or the first free address.

However, the providing of a large number of consecutive addresses may be problematic in real life systems. In standard storage systems, blocks or segments are allocated which have a maximum size of e.g. 4 Mb. Within a segment/block, the addresses are consecutive, but as the segments/blocks may be randomly allocated in the memory, the full address may not be.

In such situations, the addresses of the queues of the storing unit are grouped into groups of predetermined number of physical addresses, the groups being positioned non-consecutively. In this respect, "non-consecutively" means that the groups are not positioned neighbouring (having consecutive addresses) in the storage space. Then, the addresses implementing the queues preferably are virtual addresses defined as consecutive addresses, the controlling unit further comprising means for converting between virtual addresses and physical addresses.

Thus, any number of consecutive virtual addresses may be allocated, which are then converted to the real, physical addresses.

One manner of obtaining this is one wherein the storing unit has a number of allocatable segments/blocks, each group of physical addresses defining addresses within one of the allocatable blocks/segments, each block/segment being identifiable with an address of a first number of bits, all addresses within a block/segment being addressable using a second number of bits, the physical addresses having a number of bits corresponding to a sum of the first and second numbers of bits, the virtual addresses each comprising a first part, having at least the first number of bits, and a second part having at least the second number of bits, wherein the converting means are adapted to convert the first part of the virtual address into a third part having the first number of bits and identifying an allocated block/segment, and generating the physical address as an address having the third part and the first part.

In one situation, the assembly may comprise instructing means for instructing the process/processor as to whether to de-queue a queue or not. These instructing means may comprise data stored in the storing unit, the processes/processors being adapted to determine, from the data, whether to process a queue, and the processors being adapted to alter the data when emptying a queue.

In that situation, the instructing means are preferably formed by the processes/processors and the data, on the basis of which the processors/processes are able to determine which queue(s) to de-queue.

Alternatively, a separate element, such as a processor, may supervise the queue lengths and update the data.

In this situation, the reading/de-queuing of the data is decoupled from the storing by the apparatus. The apparatus or the controlling unit may read the data in the storing means in order to know to which queues to add data, but the processes/processors themselves update the data and act thereon so that only the process/processor allowed will de-queue data from a queue of the second group.

Naturally, the data may be updated at other points in time or by another processor/process than that having emptied a queue. This is the simplest manner, as the process/processor will know when having emptied a queue and may just as well update the data, so that the next queue may then be de-queued by another process/processor.

In this embodiment, load balancing between the processes/processors may be obtained while maintaining an ordering in the processing/de-queuing of packets within any second group.

Especially when an ordering of the stored (at least part of) data packets is important when de-queuing and/or analyzing/processing these, it is difficult to allocate such data packets to another processor/process, once a process/processor has begun de-queuing/processing these. With the present embodiment, each such group of data packets, usually a stream, is allocated to a second group of queues, each second group of queues having separate queues de-queued/processed by separate ones of the processes/processors. Thus, if the queue in which the data packets are presently stored, and which is de-queued by first processor, gets too long, i.e. the first process/processor is too busy, it is decided to identify another queue, de-queued by a second process/processor, from the same second group, but to not allow the second process/processor to de-queue data packets, before the first processor/process has de-queued all data packets from its queue in the pertaining second group. In this manner, the ordering of de-queuing of the data packets is maintained across processes/processors.

Another aspect of the invention relates to a method of operating an assembly comprising a plurality of de-queuing processors or processes and an apparatus comprising a storing unit, a controlling unit and a plurality of data receiving and storing elements, the method comprising the steps of:
the storing unit holding at least part of a plurality of data packets in a plurality of queues thereof, each queue comprising a number of storing elements each being defined by an address,
each of the processors or processes de-queuing data from a first group of the queues, the queues of the individual first groups being non-overlapping, the processors/processes forwarding information to the controlling unit in relation to a de-queuing of data from a queue,
each data receiving and storing unit:
   accessing or receiving a data packet,
   receiving, from the controlling unit, an address for storing at least part of the data packet, and
   facilitating storing of the at least part of the data packet in the storing unit at the received address,
the controlling unit:
   determining information relating to a fill level of the queues,
   selecting an address by:
   for a received/accessed data packet, determining a second group of queues, each second group of queues comprising a queue from each first group of queues, the queues of the second groups being non-overlapping, if the fill level of a presently selected, first queue of the determined second group exceeds a predetermined level, selecting a second queue of the determined second group, selecting the address as an address of the selected queue of the second group, forwarding the selected address to the receiving and storing element having received/accessed the data packet, the method further comprising the step of instructing the process/processor relating to the selected second queue of the second group to not process this queue, until the selected first queue of the second group with the exceeded predetermined level is empty.

As mentioned above, the accessing of the data packet may not require a receipt thereof in the apparatus but may be an access of the data packet when received and/or stored at a remote element with which the apparatus communicates.

In one embodiment, each data receiving and storing element further generates information relating to the received/accessed data packet and forwards the generated information to the controlling unit, the controlling unit further receives generated information, and the selecting means then select the address also on the basis of the received, generated information. This generation of information may be handled using any type of packet analysis and deriving any type of information. As mentioned above, usually a belonging to a stream or a type/protocol is relevant.

In a particular situation, the generating means generate, as at least part of the generated information, information relating to a point in time of receipt of the data packet. Thus, a time stamping is preferably performed. In this manner, the time stamping process of the receiving/storing units preferably are synchronized.

Each of the queues may be implemented as a number of consecutive addresses and the controlling means:

holds, for each queue, a write pointer identifying a next address in which to add data, or a last address to which data was added, and a read pointer identifying a next address to be read/de-queued from the queue, or a last address read/de-queued, and updates the write pointer of the queue to which the selected address relates, when an address is selected and updates, on the basis of information forwarded from the processors/processes, the read pointer of the queue from which data has been de-queued.

As mentioned above, the updating of the write pointer may require knowledge of how much data is stored, or how many addresses are taken up by the data packet.

Also, the updating of the read pointer may be made on the basis of information identifying all addresses from which data has been de-queued or simply one address.

Preferably, the addresses of the queues of the storing unit are grouped into groups of a predetermined number of physical addresses, the groups being positioned non-consecutively, and wherein the addresses implementing the queues are virtual addresses defined as consecutive addresses, the controlling unit further converts between virtual addresses and physical addresses.

As indicated above, preferably the instructing step comprises the processes/processors determining, from data stored in the storing unit, whether to process a queue, and the processors/processes, or another element, altering the data when emptying a queue.

In the following, preferred embodiments of the invention will be described with reference to the drawing, wherein.

Figure 1:
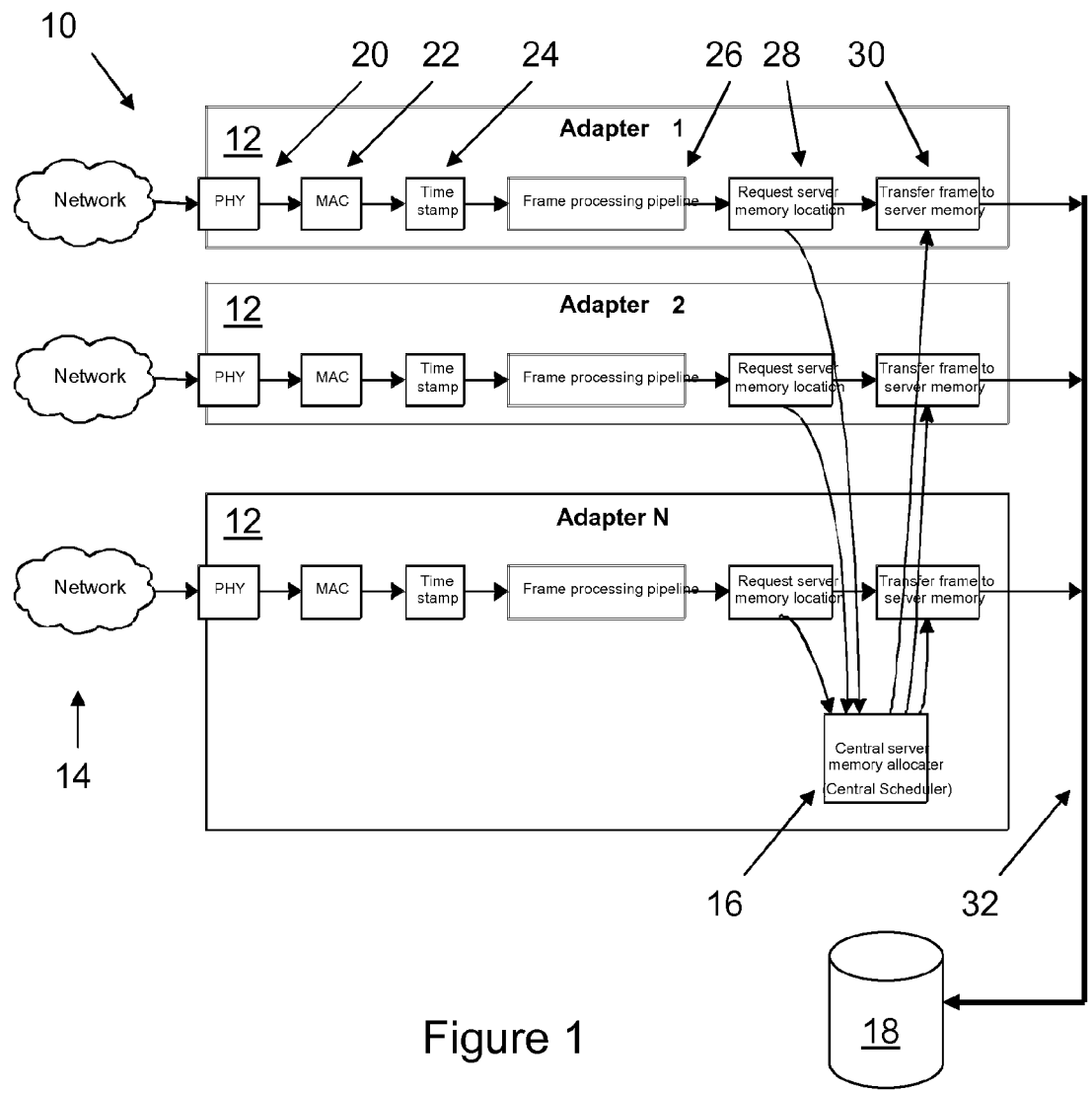
FIG. 1 illustrates a first embodiment according to the invention.

In FIG. 1, an embodiment 10 of an apparatus for analyzing and forwarding data frames is illustrated having a number of adapters 12 each connected to and receiving data from a network, such as the WWW.

In general, a system of this type may be used for receiving a large number of data packets and facilitate storage and/or forwarding thereof in a suitable manner. These data packets usually are transmitted between pairs of computers or networks on a data connection monitored by the present system. Thus, the data packets normally are not meant for nor addressed to or from the present system.

This data may, when stored, be processed by one or more subsequent processes or processors (not illustrated). In order to be able to handle very large amounts of data, structured storing is desired in order to achieve swift, yet structured, retrieval of the data. Also, a plurality of processors is provided when a single processor does not suffice, whereby separate storing of data for each processor is desired.

The processors may be used for analyzing the data traffic, for storing the data and/or for transmitting the data to other network elements, computers or the like, depending on the result of the processing in the processors.

Alternatively, or additionally, it may be desired to subsequently output the data again, whereby it may also or alternatively be desired to store the data in a manner or sequence in which the outputting is desired.

Normally, the data packets are parts of streams of data packets. When two processors or computers interact, a stream of data packets is exchanged. This stream may be a file transfer or an exchange of audio/video, such as Voice over IP. A stream is a sequence of data packets which are similar, and the belonging of a data packet to a stream is determinable, and it is desired that all data packets of a stream are stored together, in the desired order, handled by the same subsequent process or processor and/or output in that order.

The belonging of a received data frame to a stream is determined from an analysis of the frame. This analysis is described in further detail below.

The present embodiment aims at providing a set-up in which multiple adapters 12 divide the task of analyzing the frames/packages and/or storing these.

More particularly, the adapters 12 receive data frames from the network 14, such as the WWW, a trunk or network of any suitable type. Each adapter 12 receives a number of frames independently of the other adapters 12.

Preferably, all adapters, potentially except one, are identical and each comprises a so-called PHY 20, which is an element adapted to receive data frames from a network or data cable and a so-called MAC circuit 22 which converts the received frames to a standard usually used on data busses on e.g. computers.

Having received the data frame, it is provided with a time stamp in the circuit 24, where after the frame is fed to an analyzing circuit 26 which derives data relating to the data frame, such as relating to a standard the frame conforms to, such as whether it is VLAN and/or MPLS tagged, and potentially address data therefrom. A plurality of different types of standards are known, each of which defines which types of data (address, encapsulation, payload, error correction etc) are present in the frame and where such data is present. Depending on the particular type of packet, different types of data may be derived.

The circuit 26 outputs data identifying the data frame, such as its belonging to a data packet stream, or a queue in a central storage. Then, the length of the data frame, the ID/queue identification and the time stamp of the data frame is transmitted, in a request circuit 28, to a central server memory allocator or controller 16, which returns an address within the storage 18 in which the data frame is to be stored. This address is returned to a transfer circuit 30 also receiving the data frame and which subsequently transmits the data frame to the identified address via a common data bus 32, such as running a PCI Express (PCIe) protocol. This storing may be using Direct Memory Addressing, which means that the frame is stored directly at the desired address, and that no further analysis is required. This is the fastest manner of storing data in a data storage, but it requires that the physical address is known.

Naturally, the circuit 28 may alternatively output, together with or without the time stamp and length of the packet, other information identifying the frame (type, addresses or the like), whereby the allocator itself will determine the queue to which the frame is to be added and thus derive the address at which the frame is to be stored.

The "out of band" communication between the allocator 16 and the adapters 12 may be a low bandwidth point-to-point communication, a daisy chain topology, or a ring topology. This communication, as is described further below, is also used for synchronizing the clocks of the time stamp circuits 24. A suitable protocol for this communication may be a standard 64*b*/66*b* codec requiring approximately 1 Gbps full duplex bandwidth per 10 Gbps of Ethernet front port (PHY) bandwidth.

It is noted that the above embodiment 10 may store the data frames in any number of queues in the storage 18. Which queue to forward a data packet to may depend on the future destiny of the frame. If the frame is to be analyzed by one or more processors, one queue may be provided for each processor, and the forwarding of frames to a queue may depend on how long the queue is before adding the packet. If the queue is long, and the processor thus busy, the packet may be provided in a shorter queue of a processor thus less busy.

It is noted that if most data frames relate to streams, it may not be desired to transmit frames relating to the same stream to different queues for analysis by different processors. In this manner, any load balancing between processors is preferably carried out by allocating all future frames from a newly started stream to a "starving" processor. An alternative to this is described further below, as is this load balancing.

Also, if the frame is at a later point in time to be output from the storage 18, the frames to be output may be provided in a particular queue and in an order in which the frames are to be output. Such outputting is described further below.

If a given quality of service is desired, any queue may be split up into a number of queues of different priorities, so that higher priority frames may overtake lower priority frames and then be handled (processed, output, analyzed or the like) swifter.

Load Balancing within an Adapter 12

Figure 6:
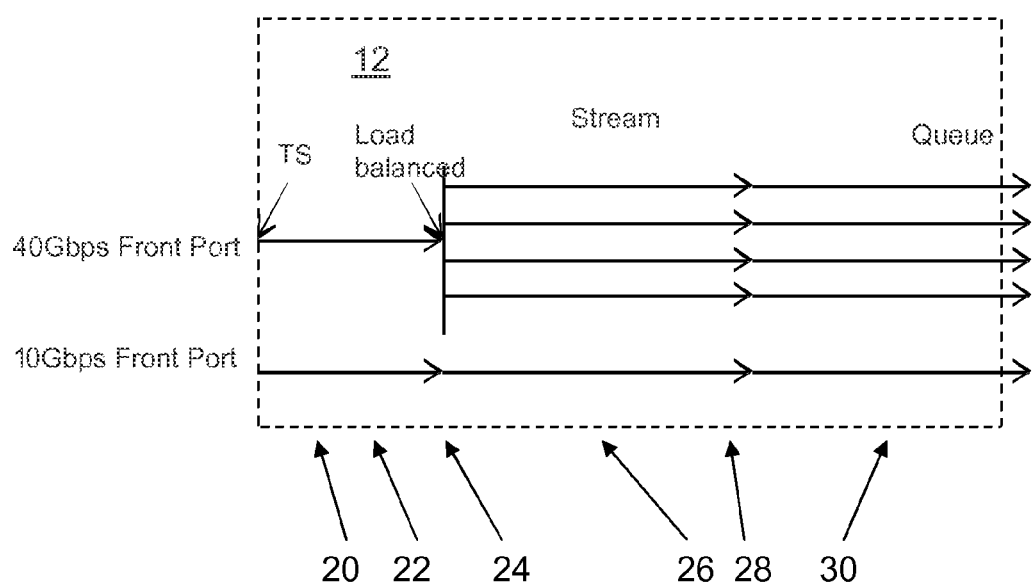
FIG. 6 illustrates load balancing within an adapter.

In FIG. 6, it is seen that part of the elements, such as the PHY 20, MAC 22 and Time Stamp allocation 24 of an adapter 12 may be working at a higher speed than that of the other elements, such as the analyzer 26, the requester 28 and the transfer circuit 30. In this situation, multiple "instantiations" of these slower elements may be made in order to divide the data packet flow received and time stamped from the elements 20-24 into multiple parallel flows. In FIG. 6, the data packets received on a single PHY 20 are divided into four parallel flows. The elements 20-30 are not directly illustrated, but their positions in the flow are.

Naturally, load balancing between the individual flows may be carried out if desired.

The lower line in FIG. 6 illustrates the alternative, where a high speed PHY 20 receives data packets which are handled in a single flow in the adapter 12.

Load Balancing of External Processes or Processors Using Multiple Queues

Load balancing of processors or processes (not illustrated) reading data from the queues of the storage 18 may be performed in a number of manners. If an ordering (order of receipt or defined by data in the individual data packets) of data packets in stream or the like is not relevant, a single queue may be provided for each processor. If the queue of one processor runs full (how this may be determined is described further below), the allocator 16 may simply effect that more data packets is transmitted to the other queue(s).

If quality of service is desired, different queues may be used for different priorities.

Figure 5:
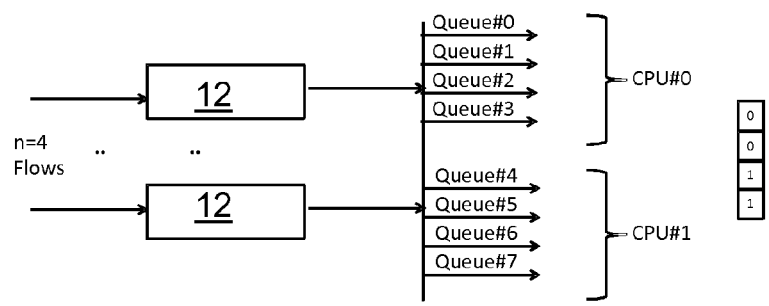
FIG. 5 illustrates load balancing between processors while maintaining order between the data packets.

If an ordering of the data packets of e.g. a stream is desired maintained, a scheme is illustrated in FIG. 5, wherein two adaptors 12 are illustrated receiving a total of 4 flows/streams of data.

The adaptors 12 transmit the data packets to a total of 8 queues (no. #0-#7) stored in the storage 18 for de-queuing by two processors (no. #0 and #1) using the following scheme: queues #0-#3 are handled by processor #0, and queues #4-#7 are handled by processor #1. Also, queues #0 and #4 are generally used for stream #0, queues #1 and #5 are used for stream #1 and so on.

Initially, data packets of stream #0 are transmitted to queue #0, but as this queue grows full, the allocator 16 starts transmitting data packets from stream #0 to queue #4. However, processor #1 is not allowed to de-queue and analyze such packets, until processor #0 has emptied queue #0. In order to control this, four bits are allocated, one for each stream, the value of which determines which processor may handle packets from each queue. In FIG. 5, the top bit controls the access to stream #0, and as its value is "0", this means that processor #0 may handle this queue and thus de-queue packets from queue #0.

It is seen that the two bottom bits are "1" indicating that processor #1 is allowed to handle streams #2 and #3 and thus de-queue from queues #6 and #7. When a processor is allowed to process more than a single queue, it may select the next queue to be processed in any suitable manner, such as round robin, priority, queue length, or the like.

The four bits are controlled by the processors and stored in the storage 18. When more than two processors are used, an ordering or sequence thereof is decided, so that when processor #1 has emptied a queue, either it will alter the corresponding bit(s), or processor #2 will notice that the queue of processor #1 is empty, alter the corresponding bit(s) and then start de-queuing its corresponding queue. The same order is used by the controller to determine to which queue, if one is full, to add the next data.

Then, in order to maintain the ordering of the data in the queues, the allocator 16, if changing a queue, will always select a new queue which is empty.

Naturally, if more than two processors are able to handle a single queue, more bits are used for each flow to indicate which processor is presently allowed to process the flow.

Virtual Address—Physical Address

In order to make the set-up more easily adapted to different systems, it is preferred that the request circuit 28, the transfer circuit 30, the allocator 16 as well as any de-queuing circuitry in or connected to the storage 18 operate in a virtual address space.

Due to the standard requirement that only a given maximum block size may be allocated for DMA, and the fact that such allocated blocks may be positioned at different or random positions in the memory in different systems or from time to time of operating the same apparatus, direct operation using the physical addresses becomes cumbersome. Hence, virtual addresses are preferred.

Presently, an address (see FIG. 2) with a total length of 32 bits is divided into two parts of which one part has a number of bits adapted to address all addresses in a maximum size allocatable block. In the present example, the max size block or segment has a size of 4 MB, requiring 22 bits for addressing. This part of the virtual and physical address is the same and is used for addressing within a single block/segment.

In order to avoid the fact that physical blocks/segments may be positioned at different addresses in the storage 18, the virtual addresses are all, at least for each queue, defined as consecutive addresses, irrespective of the fact that these may be positioned in different blocks/segments. Thus, the 32 bits will be interpreted as a number of consecutive addresses. This may be sub-divided into a number of 4 Mbyte blocks/segments, but virtually positioned consecutively. The virtual address may thus be seen as an initial 10-bit part indicating one of the consecutive virtual blocks/segments and the last 22 bits as an internal addressing within this block/segment.

In the physical reality in the storage 18, the last 22 bits addressing within a segment/block may be maintained, but the first 10-bit part of the virtual address is simply converted into an addressing or identification of one of the physically allocated blocks/segments.

Figure 2:
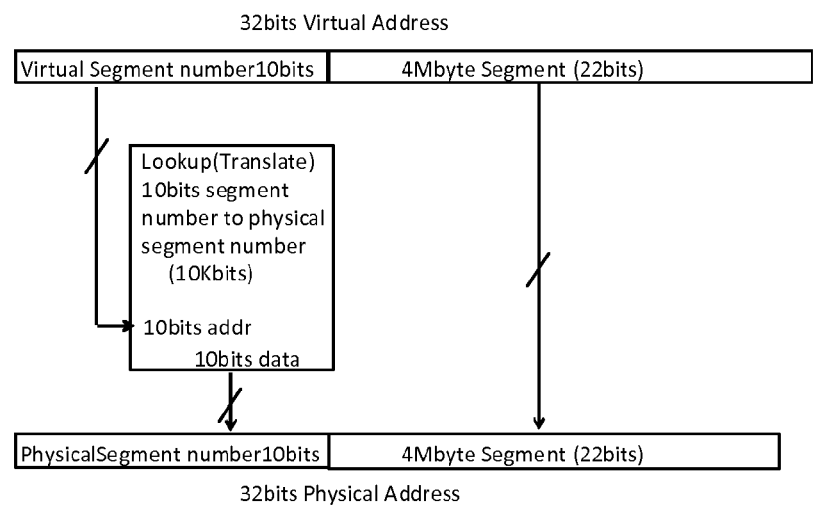
FIG. 2 illustrates conversion from virtual address to physical address.

For this use, a Look Up Table is provided for translating the first 10 bits of the virtual address to an actual identification—i.e. a 10-bit address—of an actually allocated block/segment. This Look-Up Table (LUT) may be set up at initialization of the embodiment. This is illustrated in FIG. 2.

It is noted that also the read/write pointers, which are described below, may be used in the virtual address space, which again makes e.g. determination of a queue length much easier, when the virtual addresses are defined as sequential addresses.

Naturally, as will be seen further below, if a process/processor de-queues a data item from the storage 18, the address and size (or number of addressable elements taken up) thereof may be returned to the allocator 16 as the physical address or the virtual address. In either case, the allocator 16 is able to determine the virtual address and update the pointers accordingly.

Timing—Synchronization of Clock Between the Allocator 16 and the Adapters 12

In order to have reliable and comparable time stamps for the frames received, it is desired to have synchronized clocks in the adapters 12 and the allocator 16.

Figure 3:
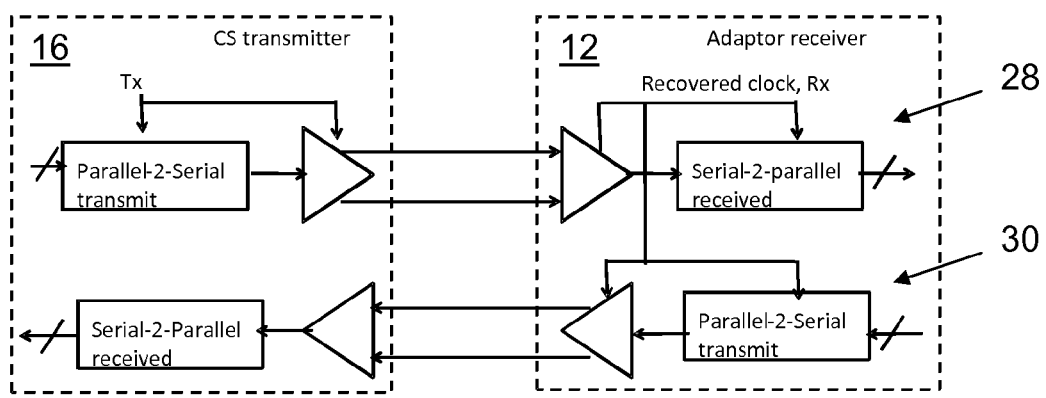
FIG. 3 illustrates synchronization of clocks between the allocator and an adapter of FIG. 1.

Clock phase synchronization is presently obtained by forwarding, with the data transferred from the allocator 16 to the transfer circuits 30, a clock signal which is encoded in the data transferred but recoverable as is usual in the art. The adapters 12 are adapted to derive this clock signal and use it both in the transfer circuit 30 and the request circuit 28, as illustrated in FIG. 3.

Having synchronized the phases, the actual clock time is synchronized in two steps. In step 1, the allocator 16 transmits to each adapter 12 an instruction to transmit a message to the allocator 16 which then determines the overall roundtrip time when receiving the message. In step 2, the allocator 16 instructs the adapter 12 to adapt its time to the clock time of the allocator 16.

More particularly, step 1 comprises the allocator 16 transmitting an instruction to the individual adapter 12 while logging the local allocator transmission time. The adapter 12, when receiving the instruction, immediately transmits a message to the allocator 16, which logs the time of receipt. The contents of the instruction and message are not important. The allocator 16 now subtracts the transmission time from the time of receipt and derives the roundtrip time. Half this time is assumed to be the time delay of a data transmission between the allocator 16 and the pertaining adapter 12. Naturally, different time delays may exist between the allocator 16 and different adapters 12.

Step 2 is the transmission from the allocator 16 to the adapter 12 of an instruction to set the local adapter time to a value being the present local time of the allocator 16 added the determined time delay. Thus, when the adapter 12 receives this instruction, it will set its local time to the time which the local time at the allocator 16 in the meantime has advanced to. Then, the clock times of the allocator 16 and the adapter 12 is synchronized to within a clock cycle of the clock signal. As the phases or clock pulses are also synchronized, the clocks will remain synchronized.

This recovered clock is then also used for time stamping the data packets received. Thus, all time stamps are synchronized to within a clock cycle.

As a number of instructions may be pending between the allocator 16 and any of the adapters 12, an identifier is provided in each instruction/request. Presently, the identifier is a time stamp between 0 and 7 (3 bits) which is shifted and wrapped around in synchronism with the clock. Thus, the allocator 16, when sending an instruction, will add the time stamp, and the adapter 12, when replying to that instruction, will copy the time stamp into the reply, so that the allocator 16 is able to determine to which instruction the reply relates.

Naturally, the present synchronization of the adapter 12 to the allocator 16 may be performed for any number of adapters 12. The adapters 12 may be connected to the allocator 16 in a star configuration in which all adapters 12 communicate directly with the allocator 16, in a ring topology, or in a daisy chain configuration having the allocator 16 at an end of a string of adapters 12 which then communicate with the allocator through one or more other adapters 12.

Operation of the Allocator 16

For each of the queues of the storage 18, the allocator 16 has two queues (see FIG. 4): a RIFO (Random In First Out) and a FIRO (First In Random Out) queue.

The FIRO queue holds the pending requests from all adapters 12 and relating to the pertaining queue of the storage 18. A Write pointer points to the next free position of the FIRO queue. A request received from an adapter 12 is received and provided in this position.

The RIFO queue holds information relating to when frames for the storage queue are to be output as well as an order thereof. Each entry in the RIFO queue relates to a point in time of the clock, and a read pointer points to the present point in time of the RIFO queue.

When a request is received, the time stamp thereof is derived, and an identifier is provided in the RIFO queue at the corresponding position or point in time. It is noted that this position or point in time may be sooner than other frames for the same storage queue due to the fact that information from some adapters 12 or the processing in such adapters 12 may take longer than from/in others.

Figure 4:
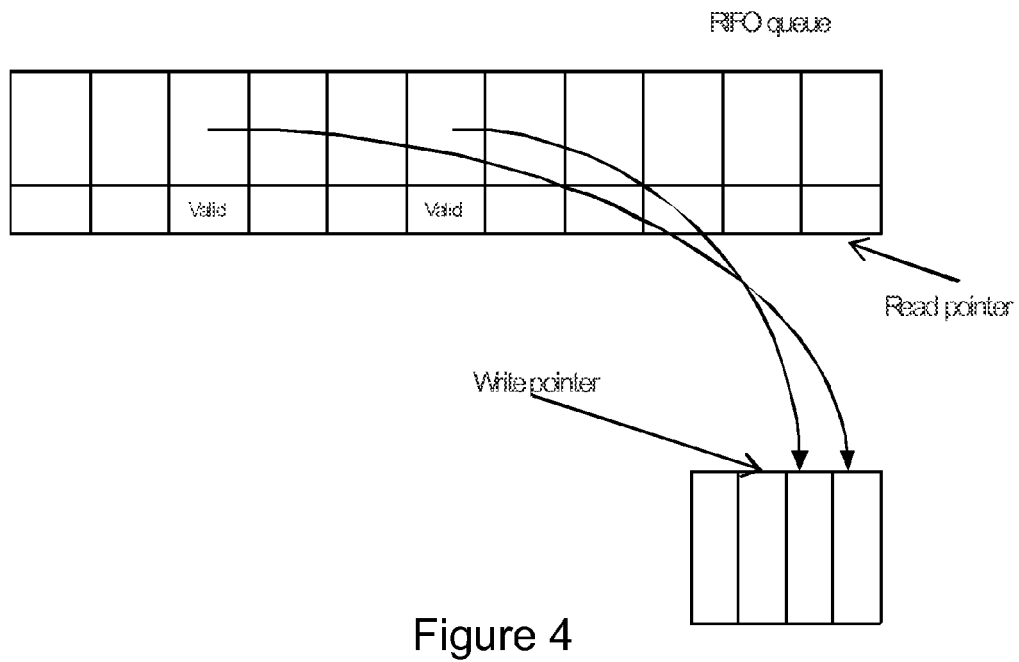
FIG. 4 illustrates a manner of ordering randomly received packets in a time sequence.

In FIG. 4, it is seen that the first frame in the FIRO queue has a later transmission time that the next frame.

The Read pointer of the RIFO queue advances once per clock cycle, and if an identifier is seen at the new position of the Read pointer, the corresponding position of the FIRO queue is addressed and a transmission instruction is transmitted to the pertaining adapter 12. Then, the corresponding entry of the FIRO queue is removed (or an end pointer is advanced to this position).

Naturally, the FIRO and RIFO queues may be implemented as circular queues.

In order to take into account any time delays caused by e.g. data transmission between the adapters 12 and the allocator 16 as well as processing times in the adapters 12, the Read pointer preferably relates to a point in time delayed in relation to the actual point in time as defined by the synchronized clocks and which is used for providing the time stamps of the frames (as is also forwarded in the requests stored in the FIRO). In this regard, when the entry is provided at the correct position in the RIFO queue, the time stamp of the relevant request is no longer needed and is discarded in order to not take up space in the tables.

Thus, the time of the Read pointer may be several, such as 3, 4, 5, 6, 7, 8, 9, 10 or more clock cycles behind the real clock. Then, a frame time stamped at e.g. time 120 may be forwarded to the FIRO queue and entered into the RIFO queue at time 120, which is addressed (Read pointer advanced to that position) at time 130.

At all times and for each queue in the storage 18, the allocator 16 has two pointers, a Write pointer identifying the next address at which a next frame from an adapter 12 is to be stored, and a Read pointer identifying the address of the next stored frame of this queue to be de-queued for further analysis, forwarding or the like. When a new frame is to be stored, the Write address is forwarded, i.e. the next virtual address is converted into its physical address which is forwarded, to the pertaining transfer circuit 30, which then facilitates storing of the frame. At the same time, the allocator 16 increases the pertaining Write pointer with a value corresponding to the size of the frame.

In the situation where one or more of the queues hold frames for further analysis of e.g. a processor, the number of frames in such a queue, or the fill level of the queue, will illustrate how busy this processor is. This is simply determined by the difference in addresses between the Write pointer and the Read pointer of the queue, when virtual addresses are used.

The de-queuing of frames from the storage 18 may be facilitated by any apparatus or process/processor, such as one connected to the storage. De-queuing a frame from the storage 18 causes this apparatus/process/processor to alter the Read pointer of this queue correspondingly.

In general, adding frames to the storage 18 makes the allocator 16 alter the write pointers, and de-queuing frames makes the processes/processors alter the read pointers. Naturally, it is desired that this information is exchanged. Several methods and schemes exist.

In one situation, it is desired to not exchange this data too often in order to preserve bandwidth on the DMA bus for the data packet exchange. In this situation, the mirroring or synchronizing is initiated by the allocator 16. Each time a data packet is written in the storage 18, the allocator 16 may update the write pointer, whereby the (number of data frames or the fill level of) individual queues will seem, to the allocator 16, to grow, as the read pointers are not updated.

Naturally, updated write pointers may be exchanged once in a while, but this is preferred to not update these, until a size of a queue exceeds a predetermined limit. At this point, the allocator 16 will update the read pointers from the storage 18 or the process(es)/processor(s) in order to obtain updated data on the actual sizes of the queues and thus of how busy the process(es)/processor(s) is/are.

In one situation, the process(es)/processor(s) may, at the same time, receive updated write pointers. In this manner, the process(es)/processor(s) may starve, if they empty all queues before information that additional packets have been stored and are ready for analysis/de-queuing. This may be avoided by updating the write pointers at the processes/processors or in the storage 18, when updating them in the allocator 18. Then, the processes/processors have updated queue information and keep operating, as long as data packets are present.

Alternatively, the updating also of the read pointers may be more frequent, in order to keep the allocator 16 and the process(es)/processor(s) better "informed". This synchronization of the Write/Read pointers could be performed when the bus 32 is not busy, or e.g. when a maximum delay has passed since the last synchronization.

Naturally, the queues or storage 18 may be circular, and a particular space may be allocated to a queue if desired.

Naturally, if an adapter 12 back to back receives multiple data frames which relate to the same stream, the request circuit 28 will transmit a number of requests which the allocator 16 then will provide at the relevant positions in the RIFO queue. If the relevant adapter 12 is identified in each entry in the RIFO queue, the allocator 16 may identify multiple, neighbouring entries in the RIFO which relate to the same adapter 12, and thus only revert to this adapters 12 transfer circuit 30 with one transmission identifying not only the queue (address data) but also the number of packets to be forwarded on the basis of this simple request.

Transmission of Data from the Storage 18 Via an Adapter 12

Naturally, data packets stored in one or more queues in the storage 18 may be de-queued, transmitted over the bus 32 and output via an adapter 12. As is the case when storing the data packets stored in the storage 18, this may be performed via DMA, whereby the adapter 12 directly reads the data packets in the storage 18 without intervention from e.g. a processor at the storage 18.

The scheme of de-queuing packets is as that described above for storing packets in the storage 18:

Data packets from a number of queues in the storage 18 may be output via the same adapter 12. These may be arbitrated using any desired scheme, such as round robin, priority or any other prioritization. In the adapter 12, any number of Tx ports or FIFOs may be provided for different flows, queues, priorities or the like, and packets from these may be output via a single PHY or via different PHYs.

In one situation, read/write pointers of a queue are stored in the storage 18 as is the case when storing data in the storage 18. In the same manner, the adapter 12 may mirror the read/write pointers and keep de-queuing data from the queue as long as data seems to be present. Mirroring may, as described above, take place at fixed maximum time intervals, when a queue seems to be too full or too empty, or the like.

The processes/processor may keep track of the Read and Write pointers and, as described above, determine whether the adapter 12 is so busy that data packets for the pertaining queue(s) should be forwarded to another queue and another adapter 12.

In another situation, a processor or process may define which data packets or addresses should be output via an adapter 12 and may forward an indication of such addresses to the adapter 12.

One manner is for the process or processor to copy such packets into a particular queue de-queued by the adapter using a particular set of read/write pointers updated by the process/processor and which is mirrored on to the adapter 12.

Another manner focuses on not copying data packets. In this situation, the data packets are maintained in the original queue, but another set of read/write pointers may be provided for use with the de-queuing of data packets. In fact, a single additional pointer is required, if the original read/write pointers of the queue are maintained. The additional pointer indicates where, in the queue, the process/processor has come to in the analysis and, thus, which of the addresses between the read and write pointer may be de-queued. This additional pointer is maintained by the processor/process and forwarded to or read by the adapter using e.g. DMA, and the pertaining adapter informs the processor/process or the controlling circuit 16, when an address has been de-queued.

The invention claimed is:

1. An assembly comprising an apparatus for receiving and storing data packets and a plurality of de-queuing processors or processes, the apparatus comprising a storing unit, a controlling unit and a plurality of data receiving and storing elements, wherein:
   the storing unit is configured to hold at least part of a plurality of data packets in a plurality of queues thereof, each queue comprising a number of storing elements each being defined by an address,
   each processor or process is configured to de-queue data from a first group of the queues, the queues of the individual first groups being non-overlapping, the processors/processes being configured to forward information to the controlling unit in relation to a de-queuing of data from a queue,
   each data receiving and storing unit comprises a first processor configured to:
      access or receive a data packet,
      receive from the controlling unit an address for storing at least part of the data packet, and
      facilitate storing of the at least part of the data packet in the storing unit at the received address,
   the controlling unit comprises a second processor configured to:
      determine information relating to a fill level of the queues,
      select an address by:
   for a received/accessed data packet, determining a second group of queues, each second group of queues comprising a queue from each first group of queues, the queues of the second groups of queues being non-overlapping,
   if the fill level of a presently selected first queue of the determined second group exceeds a predetermined level, selecting a second queue of the determined second group,
   selecting the address as an address of the selected queue of the second group,
      forward the selected address to the receiving and storing element having received/accessed the data packet,
the process/processor relating to the selected second queue being configured to not process this queue, until the selected first queue with the exceeded predetermined level is empty.

2. The assembly according to claim 1, wherein the first processor of each data receiving and storing element is configured to generate information relating to the received/accessed data packet and forward the generated information to the controlling unit,
   the second processor of the controlling unit further being configured to receive generated information, and select the address by selecting the address also on the basis of the received, generated information.

3. The assembly according to claim 2, wherein the first processor is configured to generate, as at least part of the generated information, the information relating to a point in time of receipt of the data packet.

4. The assembly according to claim 1, wherein each of the queues is implemented as a number of consecutive addresses and the controlling unit:
   is configured to hold, for each queue, a write pointer identifying a next address in which to add data and a read pointer identifying a next address to be read/de-queued from the queue, and
   comprises a third processor configured to:
      update the write pointer of the queue to which the selected address relates, when an address is selected and
      update, on the basis of information forwarded from the processors/processes, the read pointer of the queue from which data has been de-queued.

5. The assembly according to claim 4, wherein the addresses of the queues of the storing unit are grouped into groups of a predetermined number of physical addresses, the groups being positioned non-consecutively, and wherein the addresses implementing the queues are virtual addresses defined as consecutive addresses, the controlling unit further comprises a third processor configured to convert between virtual addresses and physical addresses.

6. The assembly according to claim 1, further comprising an instructing means configured to instruct the process/processor as to whether to de-queue a queue or not the instructing means comprising data stored in the storing unit, the processes/processors being configured to determine, from the data, whether to process a queue, and the processors being configured to alter the data when emptying a queue.

7. A method of operating an assembly comprising a plurality of de-queuing processors or processes and an apparatus comprising a storing unit, a controlling unit and a plurality of data receiving and storing elements, the method comprising the steps of:
   the storing unit holding at least part of a plurality of data packets in a plurality of queues thereof, each queue comprising a number of storing elements each being defined by an address,
   each of the processors or processes de-queuing data from a first group of the queues, the queues of the individual first groups being non-overlapping, the processors/processes forwarding information to the controlling unit in relation to a de-queuing of data from a queue,
   each data receiving and storing unit:
      accessing or receiving a data packet,
      receiving, from the controlling unit, an address for storing at least part of the data packet, and
      facilitating storing of the at least part of the data packet in the storing unit at the received address,
   the controlling unit:
      determining information relating to a fill level of the queues,
      selecting an address by:
         for a received/accessed data packet, determining a second group of queues, each second group of queues comprising a queue from each first group of queues, the queues of the second groups being non-overlapping, if the fill level of a presently selected, first queue of the determined second group exceeds a predetermined level, selecting a second queue of the determined second group, selecting the address as an address of the selected queue of the second group, forwarding the selected address to the receiving and storing element having received/accessed the data packet, the method further comprising the step of instructing the process/processor relating to the selected second queue of the second group to not process this queue, until the selected first queue of the second group with the exceeded predetermined level is empty.

8. The method according to claim 7, wherein each data receiving and storing element further generates information relating to the received/accessed data packet and forwards the generated information to the controlling unit, the controlling unit further receives generated information, and the selecting means then select the address also on the basis of the received, generated information.

9. The method according to claim 8, wherein the generating means generate, as at least part of the generated information, information relating to a point in time of receipt of the data packet.

10. The method according to claim 9, wherein each of the queues is implemented as a number of consecutive addresses and the controlling means:

holds, for each queue, a write pointer identifying a next address in which to add data and a read pointer identifying a next address to be read/de-queued from the queue, and updates the write pointer of the queue to which the selected address relates, when an address is selected and updates, on the basis of information forwarded from the processors/processes, the read pointer of the queue from which data has been de-queued.

11. The method according to claim 10, wherein the addresses of the queues of the storing unit are grouped into groups of predetermined number of physical addresses, the groups being positioned non-consecutively, and wherein the addresses implementing the queues are virtual addresses defined as consecutive addresses, the controlling unit further converts between virtual addresses and physical addresses.

12. The method according to claim 11, further comprising an instructing step, wherein the instructing step comprises the processes/processors determining, from data stored in the storing unit, whether to process a queue, and the processors/processes altering the data when emptying a queue.

* * * * *